Patented Jan. 29, 1929.

1,700,387

UNITED STATES PATENT OFFICE.

LEON W. STETSON, OF CRANSTON, RHODE ISLAND.

CONFECTION.

No Drawing. Application filed June 29, 1923, Serial No. 648,570. Renewed July 17, 1928.

The present invention relates to a new form of confection having certain of the physical properties of chewing gum but differing therefrom in essential respects.

It will be evident to those skilled in the art that chewing gums in their present form generally consist of a gum such as chicle or one of its substitutes or a mixture of chicle and a substitute combined with sweetening and flavoring ingredients. The reduction of this "gum" to a plastic condition by chewing largely eliminates the sweetening and flavoring ingredients at the outset, leaving a smaller residue of a practically tasteless and insoluble substance having no nutritive value. The continued action of chewing or mouthing this insoluble residue with the flow of saliva attendant thereon frequently creates a feeling of faintness on the part of the user, especially if the act of chewing is long continued.

According to the present invention, a new and much improved form of confection has been developed which has the feel and chewing properties of the present "gums," readily assuming and maintaining a plastic condition while retained in the mouth. This new form of confection, however, is gradually dissolved by the saliva of the mouth or disintegrated by the act of chewing or both without substantially altering its chewing properties and is thereafter assimilated by the digestive system until the chewing cud has completely disappeared. This capacity for a gradual assimilation of the confection during the process of chewing or mouthing, together with the fact that it provides a pleasant, easily digested and nutritious food, makes the confection much superior to ordinary chewing gums.

The confection consists essentially of a digestible nutritious and plastic base such as gluten, a binder which serves to maintain the base in such a condition that the entire compound readily becomes plastic upon chewing and possibly certain additional ingredients designed to add to the plasticity of the compound and to enhance the taste and flavor of the confection. The plastic base is either slowly dissolved in the saliva of the mouth or gradually disintegrates by the act of chewing, this gradual decrease in the base taking place relatively slowly and without any substantial alteration of the plastic condition until a complete disappearance.

One example of a confection which embodies certain of the desirable attributes of the present invention consists of wheat gluten, hydrogenated peanut oil and water in substantially equal proportions by weight combined with a slightly smaller proportion of glucose, the ingredients being thoroughly mixed in a finely divided state and thereafter dried slowly. To this compound may be added any desired ingredients or extracts to impart a pleasant flavor or taste to the confection. The resulting product embodies certain physical characteristics of the usual form of chewing gum in that it readily assumes a plastic condition suitable for chewing or mouthing and tenaciously retains this condition until completely assimilated. In addition the flavor is probably retained for a longer period than in the usual form of chewing gum. It differs from the usual form of chewing gum in at least two essential respects, however. In the first place, the base of wheat gluten, the binder of hydrogenated peanut oil and the glucose all have a distinct food value and constitute articles of diet which may be readily assimilated even by young children. Furthermore the continued chewing and mastication of this confection causes a very gradual assimilation of the nutritious base and binder until eventually the entire confection is dissolved or disintegrated and disappears. This process, however, is slow and does not affect the physical characteristics of the confection and is ordinarily not noted by the user, except by a very gradual decrease in volume, until a complete disappearance of the confection takes place. A further advantage of the present confection resides in the fact that it may be accidentally or intentionally swallowed in bulk and be assimilated by the digestive system as any other article of food.

From the foregoing description it will be evident that although my new confection has certain of the physical properties and attributes of the present chewing gums and should be acceptable to all users of chewing gums, as well as others, nevertheless this new confection in principle differs markedly from chewing gums as at present constituted and is compared with these "gums" merely for descriptive purposes. The term "plastic" as used throughout the specification and claims is intended to define the "feel" and chewing properties of the usual types of chewing gums and to differentiate the present confection in this respect from chewing candies and confections made largely from sugar which may be chewed for a short period but as soon as completely masticated are immediately dissolved by the saliva.

I claim:

1. A confection comprising a gluten, and a binder for permanently maintaining a substantially plastic and tenacious condition of the gluten.

2. A confection comprising a digestible gluten, a flavoring ingredient, and means for permanently maintaining a substantially plastic condition of the gluten.

LEON W. STETSON.